United States Patent
Chen et al.

(10) Patent No.: US 12,205,215 B2
(45) Date of Patent: Jan. 21, 2025

(54) SYSTEM AND METHOD FOR ANIMATED EMOJI RECORDING AND PLAYBACK

(71) Applicant: Lemon Inc., Grand Cayman (KY)

(72) Inventors: Zhili Chen, Los Angeles, CA (US); Shouhan Gao, Culver City, CA (US); Vishnuvardhan Tanguturi, Culver City, CA (US); Yuxi Zhang, Los Angeles, CA (US); Bo Hu, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 160 days.

(21) Appl. No.: 17/507,952

(22) Filed: Oct. 22, 2021

(65) Prior Publication Data

US 2023/0127495 A1     Apr. 27, 2023

(51) Int. Cl.
    *G06T 13/80*     (2011.01)
    *G06T 13/40*     (2011.01)

(52) U.S. Cl.
    CPC .............. *G06T 13/80* (2013.01); *G06T 13/40* (2013.01); *G06T 2200/24* (2013.01)

(58) Field of Classification Search
None
See application file for complete search history.

(56) References Cited

U.S. PATENT DOCUMENTS

| | | |
|---|---|---|
| 2015/0113084 A1 | 4/2015 | Kimura et al. |
| 2018/0336715 A1* | 11/2018 | Rickwald .............. G06V 40/175 |
| 2023/0023653 A1 | 1/2023 | Watanabe |

FOREIGN PATENT DOCUMENTS

| | | |
|---|---|---|
| CN | 111314204 A | 6/2020 |
| JP | 2014029666 A | 2/2014 |
| JP | 2021189674 * | 5/2020 |
| WO | 2021169431 A1 | 9/2021 |
| WO | 2021210585 A1 | 10/2021 |

OTHER PUBLICATIONS

Machine Translation JP2021-189674 (Year: 2020).*
International Search Report mailed on Apr. 28, 2023 in International Application No. PCT/SG2022/050681.
Notice of Reasons for Refusal for Japanese Patent Application No. 2023575652, mailed Oct. 1, 2024, 8 pages.
Communication pursuant to Rules 70(2) and 70a(2) EPC for European Application No. 22884168.0, mailed Oct. 22, 2024, 1 page.

* cited by examiner

*Primary Examiner* — Peter Hoang
(74) *Attorney, Agent, or Firm* — Faegre Drinker Biddle & Reath LLP (57) ABSTRACT

Systems and methods for managing an animated emoji playback are provided. In particular, a server may monitor user interactions, wherein the user interactions include users interacting with objects of other users. The server may detect an action performed by a first user of the users on an object of a second user of the users and determine if the detected action is a triggering action defined by the second user that triggers a playback of an animated emoji of the second user. In response to determining that the detected action is the triggering action, the server may preset the playback of the animated emoji of the second user to the first user.

17 Claims, 8 Drawing Sheets

SYSTEM AND METHOD FOR ANIMATED EMOJI RECORDING AND PLAYBACK

BACKGROUND

Emojis are widely used in various applications to provide users with means for supplementing input text with pictorial elements to provide an emotional or tonal context. However, oftentimes the emojis provided by the applications are limited to a predefined set of expressions and require manual input from users to be sent to another users. Hence, there remains a need to develop recording and playback features of personalized emojis to enhance the user experience.

It is with respect to these and other general considerations that the aspects disclosed herein have been described. Also, although relatively specific problems may be discussed, it should be understood that the examples should not be limited to solving the specific problems identified in the background or elsewhere in this disclosure.

SUMMARY

In accordance with at least one example of the present disclosure, a method for managing an animated emoji playback is described. The method may include monitoring user interactions, wherein the user interactions include users interacting with objects of other users, detecting an action performed by a first user of the users, determining if the detected action is a triggering action defined by the second user that triggers a playback of an animated emoji of a second user, and presenting, in response to determining that the detected action is the triggering action, the playback of the animated emoji of the second user to the first user.

In accordance with at least one example of the present disclosure, a computing device for managing an animated emoji playback is described. The computing device may include a processor and a memory having a plurality of instructions stored thereon that, when executed by the processor, causes the computing device to: monitor user interactions, wherein the user interactions include users interacting with objects of other users, detect an action performed by a first user of the users, determine if the detected action is a triggering action defined by a second user that triggers a playback of an animated emoji of the second user, and present, in response to determination that the detected action is the triggering action, the playback of the animated emoji of the second user to the first user.

In accordance with at least one example of the present disclosure, a non-transitory computer-readable medium storing instructions for managing an animated emoji playback is described. In examples, the instructions when executed by one or more processors of a computing device, cause the computing device to: monitor user interactions, wherein the user interactions include users interacting with objects of other users, detect an action performed by a first user of the users, determine if the detected action is a triggering action defined by a second user that triggers a playback of an animated emoji of the second user, and present, in response to determination that the detected action is the triggering action, the playback of the animated emoji of the second user to the first user.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, an animated emoji management system allows users to create personalized animated emojis for their own avatars with custom facial expressions in real-time and/or offline. The animated emojis may be used to interact with other users. To do so, some animated emojis may be associated with certain actions. For example, a user's profile picture may show a different animated emoji based on an action triggered by another user. As an example, when a host user uploads content (e.g., a post, a video clip), other users may interact with the content by pressing a like button on the content (e.g., within a host user feed). When a user likes the content, the user will see an automatic change in a profile picture of the host to a particular animated emoji of the host that is associated with the like action. In such an example, the profile picture of the host goes back to a static picture after the animated emoji has been played. It should be appreciated that the static picture may be a static picture associated with the particular animated emoji or an original profile picture of the host.

In other aspects, the users may use the personalized animated emojis of their own avatars as predefined animations when messaging other users or replying messages. Additionally, the animated emojis may be used to react to a message received from other users. For example, if a user receives a smiley face emoji from another user, a particular animated emoji of the user may automatically be sent to another user.

In other example, a host user may start recording a live video with an avatar effect. When the avatar effect is applied on the live video, a user avatar of the host may follow the host in a live mode. For example, a facial expression of the user avatar is driven by the face of the real host user. During the live video, other users may interact with the host user by sending a gift or pressing a like button on the live video. When the gift is sent or the like button is pressed by another user, the user avatar automatically follows a predefined animation of an animated emoji of the host associated with the triggered action on the live stream video. In other words, the user avatar of the host user may react (e.g., laughing) to the triggering action (e.g., receiving a gift) even if the host user does make any facial expression. Alternatively, the host user may manually select an animated emoji to playback the facial expression of the user avatar that mirrors a facial expression of the selected animated emoji. In other words, the animated emoji management system allows users to record and playback personalized animated emojis to interact with other users in real-time.

Figure 1:
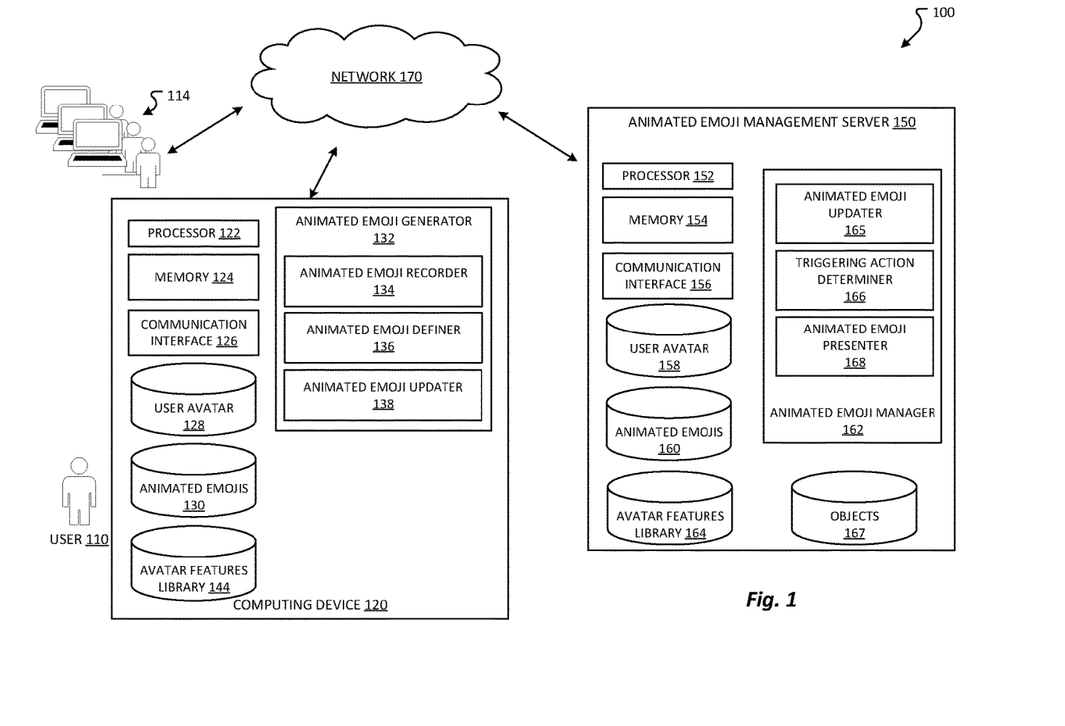
FIG. 1 depicts an example animated emoji management system in accordance with examples of the present disclosure.

FIG. 1 depicts an animated emoji management system 100 for recording and playback of personalized animated emojis in accordance with examples of the present disclosure. To do so, a user 110 may generate a user avatar and animated emojis using the user avatar. For example, the user 110 may generate the user avatar by selecting one or more features from an avatar feature library using an avatar feature selection tool. To do so, the animated emoji management system 100 includes a computing device 120 associated with the user 110 and an animated emoji management server 150 that is communicatively coupled to the computing device 120 via a network 170. The network 170 may include any kind of computing network including, without limitation, a wired or wireless local area network (LAN), a wired or wireless wide area network (WAN), and/or the Internet. The computing device 120, although depicted as a desktop computer in FIG. 1 for example, may be any one of a portable or non-portable computing device. For example, the computing device 120 may be a smartphone, a laptop, a desktop, a server, a wearable electronic device, an intelligent home appliance, etc.

The user 110 may utilize the computing device 120 to generate a user avatar and one or more animated emojis. To do so, the computing device 120 may include a communication interface 126, a processor 122, and a computer-readable storage 124. In examples, the communication interface 126 may be coupled to the network 170 and receive a user avatar database 128, an animated emojis database 130, and/or an avatar features library 164. The user 110 may select one or more features from the avatar features library 144 or 164 to generate a user avatar. It should be appreciated that, in some aspects, the user 110 may generate multiple avatars that are associated with the user. To do so, the computing device 120 is configured to provide an avatar feature selection tool that includes one or more avatar features to the user 110, which are stored in an avatar feature library (e.g., 144 and/or 164). For example, the computing device 120 may communicate with the animated emoji management server 150 to access an avatar features library (e.g., 164) stored at the animated emoji management server 150 via the network 170. Additionally, or alternatively, the avatar features library may be downloaded on the computing device 120 and stored in an avatar features library 144. In such examples, the computing device 120 may access the avatar features library (e.g., 144). As examples, the one or more avatar features may include any facial features or shapes (e.g., a head, hair, eyes, eyebrows, nose, mouth, ears, and wrinkles) and any accessories that may be put on the facial features (e.g., glasses, a hat, earrings, and a nose ring). It should be appreciated that some avatar features may be preselected as a default. Once the user avatar is created, the user avatar is stored in the user avatar database 128 of the computing device 120. Additionally, the computing device 120 may be configured to transmit the user avatar to the animated emoji management server 150 to be stored in the user avatar database 158.

Additionally, the user 110 may further utilize the computing device 120 to generate one or more animated emojis using the user avatar. To do so, the computing device 120 may include one or more applications may be provided by the computing device 120. In the illustrative aspect, the one or more applications include an animated emoji generator 132, which further includes an animated emoji recorder 134, an animated emoji definer 136, and an animated emoji updater 138.

The animated emoji generator 132 is configured to generate one or more animated emojis. In some aspects, the animated emoji generator 132 is configured to receive a request from the user to generate an animated emoji. If the user 110 has more than one user avatar, the request may include an indication of a particular user avatar to be used to generate an animated emoji associated with the user 110.

The animated emoji recorder 134 is configured to record an animation of the user avatar with a user custom facial expression. For example, an animated emoji may be an animation of the user avatar with the user's smiling facial expression. Additionally, in some aspects, the animated emoji recorder 134 may be configured to generate an animated emoji based on predefined expressions or gestures. For example, the predefined expressions or gestures may include smiling, kissing, crying, or frowning facial expression. It may also include predefined effects, for example, hearts, stars, tears, or confetti.

The animated emoji definer 136 is configured to associate an animated emoji with an action that triggers a playback of the animated emoji. For example, the triggering action may include receiving a like on a content or receiving a gift during a live video. As an example, an animated emoji with smiling or laughing facial expression may be associated with an action of receiving a like on a content. In another example, an animated emoji with smiling facial expression with floating hearts may be associated with an action of receiving a gift during a live video.

The animated emoji updater 138 is configured to store the animated emoji with the associated action. For example, the animated emoji may be stored in an animated emojis database 130 of the computing device 120. Additionally, the animated emoji updater 138 is further configured to transmit the animated emoji to the animated emoji management server 150 to be stored in an animated emojis database 160.

Moreover, the animated emoji management server 150 is configured to monitor user interactions with objects that are uploaded to one or more database that are associated with the animated emoji management server 150 and manage animated emojis of users based on the user interactions. To do so, the animated emoji management server 150 includes a communication interface 156, a processor 152, and a computer-readable storage 154. In examples, the communication interface 156 may be coupled to the network 170 and may communicate with one or more computing devices that are associated with the users to receive and/or transmit user avatars, animated emojis, and/or avatar features. The user avatars are stored in a user avatar database 158, the animated emojis are stored in an animated emojis database 160, and the avatar features are stored in an avatar features library 164.

As described above, the animated emoji management server 150 is configured to manage animated emojis of the users. To do so, one or more applications may be provided by the animated emoji management server 150. In the illustrative aspect, the one or more applications include an animated emoji manager 162, which further includes an animated emoji updater 164, a triggering action determiner 166, and an animated emoji presenter 168.

Specifically, the animated emoji updater 165 is configured to update one more animated emojis generated or modified by the users and store them in the animated emojis database 160. The animated emoji updater 165 may be configured to transmit one or more new or updated animated emojis generated by a user to a computing device associated with the user.

The triggering action determiner 166 is configured to monitor user interaction with objects. For example, the triggering action determiner 166 is configured to determine whether a user interacts with an object by liking, commenting, or otherwise reacting to the object of another user (e.g., a host user). The objects may include any contents (e.g., photos, videos, live stream videos) that are uploaded to the animated emoji management server 150 and/or other server associated with animated emoji management system 100 that is communicatively coupled to the animated emoji management server 150. The objects may be stored in an object database 167 of the emoji management server 150. Alternatively, in some examples, the objects may be stored at a remote database that is communicatively coupled to the animated emoji management server 150. If a user interaction is determined, the triggering action determiner 166 is further configured determine if the detected action triggers a playback of an animated emoji of the host user. To do so, the triggering action determiner 166 is configured to determine if the detected action is associated with any one of animated emojis defined by the host user. If so, the triggering action determiner 166 triggers a playback of the animated emoji.

The animated emoji presenter 168 is configured to present an animated emoji of a host user to another user (e.g., 114), who triggered an action that is associated with the animated emoji.

It should be appreciated that, in the illustrative aspect, the associated animated emoji may be automatically presented to the user who triggered the detected action without receiving any a host input. For example, if a visiting user likes a video clip posted by a host user, the animated emoji presenter 168 may automatically present an animated emoji of the host user that is associated with the like action to the visiting user. In other words, an automatic playback of the animated emoji is presented to the visiting user who triggered the action that is associated with the animated emoji. In other example, if a visiting user sends a present to a host user while watching a live video of the host user, the animated emoji presenter 168 may automatically present an animated emoji of the host user that is associated with such an action to the visiting user. It should be appreciated that, in some aspect, the animated emoji presenter 168 may present an input option to the host user, such that the host user can manually send the animated emoji to the guest user. For example, the input option may be embodied as an image or icon that appears on a display screen of a computing device of the host user. The image or icon may be a short cut to sending a particular animated emoji of the host user that is associated with receiving a gift. In response, if the host user selects or touches the image or icon, the animated emoji presenter 168 sends the animated emoji of the host user to the guest user.

Figure 2:
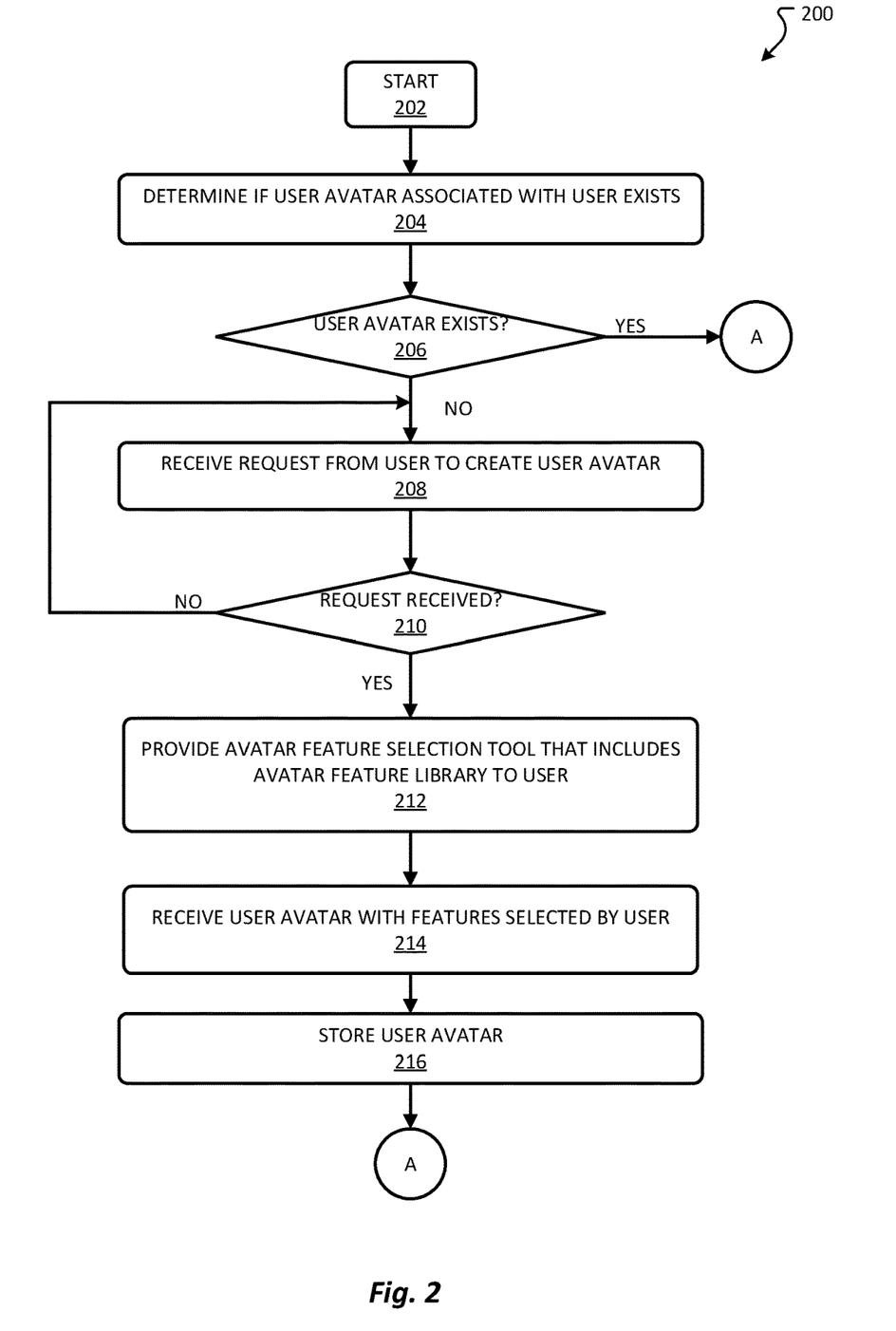
FIGS. 2 and 3 depict details of a method for generating one or more animated emojis of a user in accordance with examples of the present disclosure.
Figure 3:
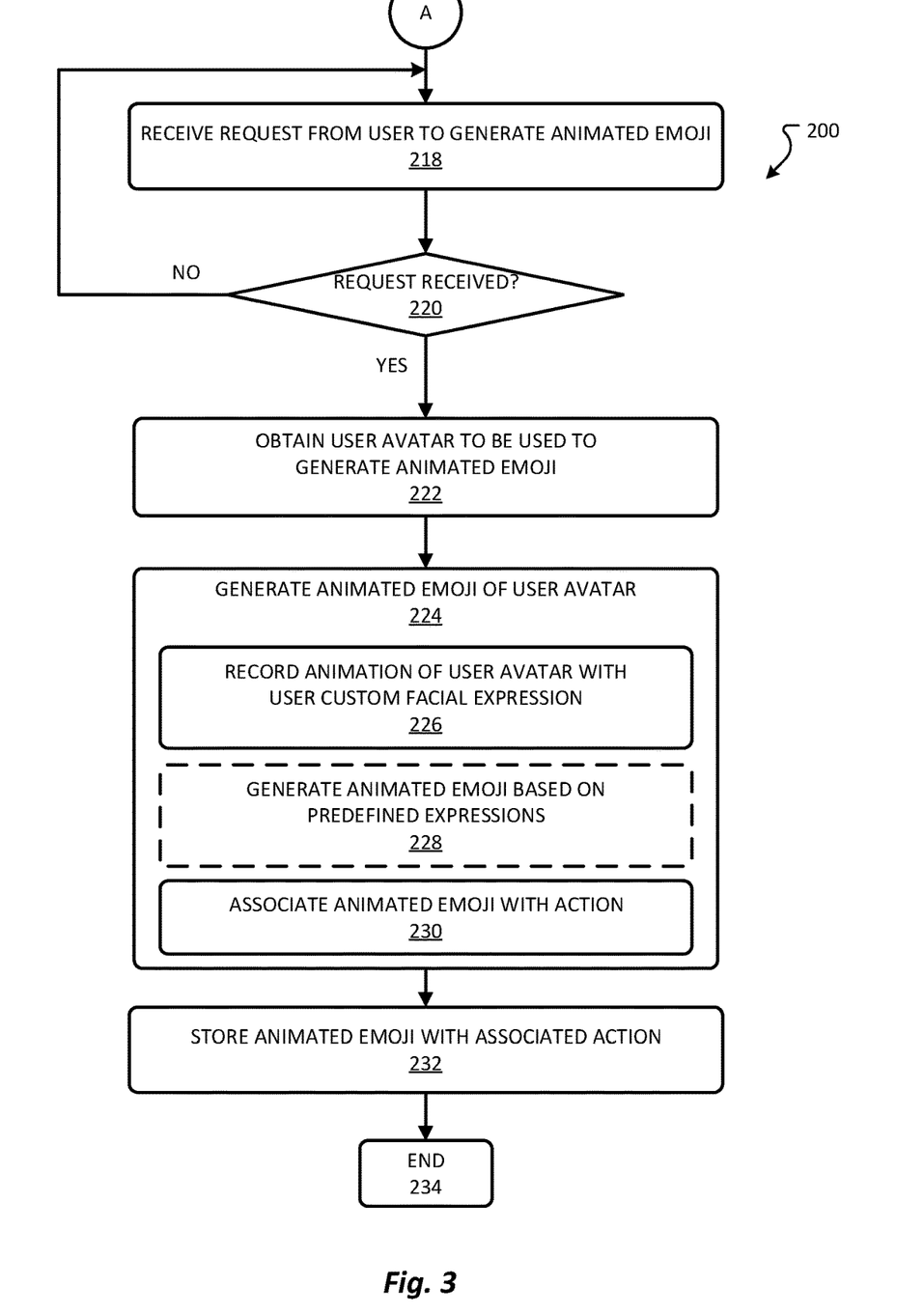

Referring now to FIGS. 2 and 3, a simplified method for generating one or more animated emojis of a user in accordance with examples of the present disclosure is provided. A general order for the steps of a method 200 is shown in FIGS. 2 and 3. Generally, the method 200 starts at 202 and ends at 234. The method 200 may include more or fewer steps or may arrange the order of the steps differently than those shown in FIGS. 2 and 3. The method 200 can be executed as a set of computer-executable instructions executed by a computer system and encoded or stored on a computer readable medium. In the illustrative aspect, the method 200 is executed by a computing device (e.g., 120) associated with a user (e.g., 110). However, it should be appreciated that aspects of the method 200 may be performed by one or more processing devices, such as a computing device or server (e.g., 120, 150). Further, the method 200 can be performed by gates or circuits associated with a processor, Application Specific Integrated Circuit (ASIC), a field programmable gate array (FPGA), a system on chip (SOC), a neural processing unit, or other hardware device. Hereinafter, the method 200 shall be explained with reference to the systems, components, modules, software, data structures, user interfaces, etc. described in conjunction with FIG. 1.

The method 200 starts at 202, where flow may proceed to 204. At 204, the computing device 120 determines if a user avatar associated with the user 110 exists. If the computing device 120 determines that the user avatar exists in operation 206, the method 200 skips ahead to operation 218 in FIG. 3 as shown by the alphanumeric character A in FIGS. 2 and 3, which is described further below. If, however, the computing device 120 determines that the user avatar does not exist in operation 206, the method 200 advances to operation 208.

At operation 208, the computing device 120 receives a request from a user 110 to create a user avatar. If the computing device 120 determines that a request has not been received at operation 210, the method 200 loops back to operation 208 to continue awaiting a user request. If, however, the computing device 120 determines that a request has been received, the method 200 proceeds to operation 212.

At operation 212, the computing device 120 provides an avatar feature selection tool that includes one or more avatar features to the user 110, which are stored in an avatar feature library 144. It should be appreciated that the avatar feature library 144 may be received from an avatar feature library 164 stored at the animated emoji management server 150. For example, the one or more avatar features may include any facial features or shapes (e.g., a head, hair, eyes, eyebrows, nose, mouth, ears, and wrinkles) and any accessories that may be put on the facial features (e.g., glasses, a hat, earrings, and a nose ring). It should be appreciated that some avatar features may be preselected as a default.

At operation 214, the computing device 120 receives a user avatar with one or more features selected by the user.

Subsequently, at operation 216, the computing device 120 stores the user avatar in a user avatar database 128 of the computing device 120. Additionally, the computing device 120 transmits the user avatar to the animated emoji management server 150 to be stored in a user avatar database 158. Subsequently, the method 200 proceeds to operation 218 in FIG. 3 as shown by the alphanumeric character A in FIGS. 2 and 3, which is described further below.

At operation 218, the computing device 120 receives a request from the user to generate an animated emoji. If the computing device 120 determines that a request has not been received in operation 220, the method 200 loops back to operation 218 to continue awaiting a user request. If, however, the computing device 120 determines that a request has been received in operation 220, the method 200 proceeds to operation 222.

At operation 222, the computing device 120 obtains, retrieves, or otherwise receives the user avatar to be used to generate an animated emoji associated with the user 110. As described above, the user avatar may be stored in the user avatar database 128 on the computing device 120 and/or the user avatar database 158 on the animated emoji management server 150.

Subsequently, at operation 224, the computing device 120 generates an animated emoji of the user avatar. To do so, the computing device 120 records an animation of the user avatar with a user custom facial expression. It should be appreciated that the user 110 may generate an animated emoji and playback personalized animated emojis to interact with other users (e.g., 114) in real-time (e.g., inside a user feed, within live stream gifting, in a chat room, or responding to user interactions).

Additionally, in some aspects, the computing device 120 may generate an animated emoji based on predefined expressions or gestures, as indicated in operation 228. For example, the predefined expressions or gestures include smiling, kissing, crying, or frowning facial expression. It may also include predefined effects, for example, hearts, stars, tears, or confetti.

At operation 230, the computing device 120 associates the animated emoji with an action that may trigger a playback of the animated emoji. For example, the triggering action may include receiving a like on a content or receiving a gift during a live video. As an example, an animated emoji with smiling or laughing facial expression may be associated with an action of receiving a like on a content. In another example, an animated emoji with smiling facial expression with floating hearts may be associated with an action of receiving a gift during a live video.

At operation 232, the computing device 120 stores the animated emoji with the associated action. For example, the animated emoji may be stored in an animated emojis database 130 of the computing device 120. Additionally, the computing device 120 transmits the animated emoji to the animated emoji management server 150 to be stored in an animated emojis database 160. The method may end at 234.

It should be appreciated that, in some examples, the animated emoji generation may be performed by the animated emoji management server 150, details of which are similar as described above. It should be also appreciated that parts of the animated emoji generation may be performed by the computing device 120 and the animated emoji management server 150, detailed of which are similar as described above.

Figure 4:
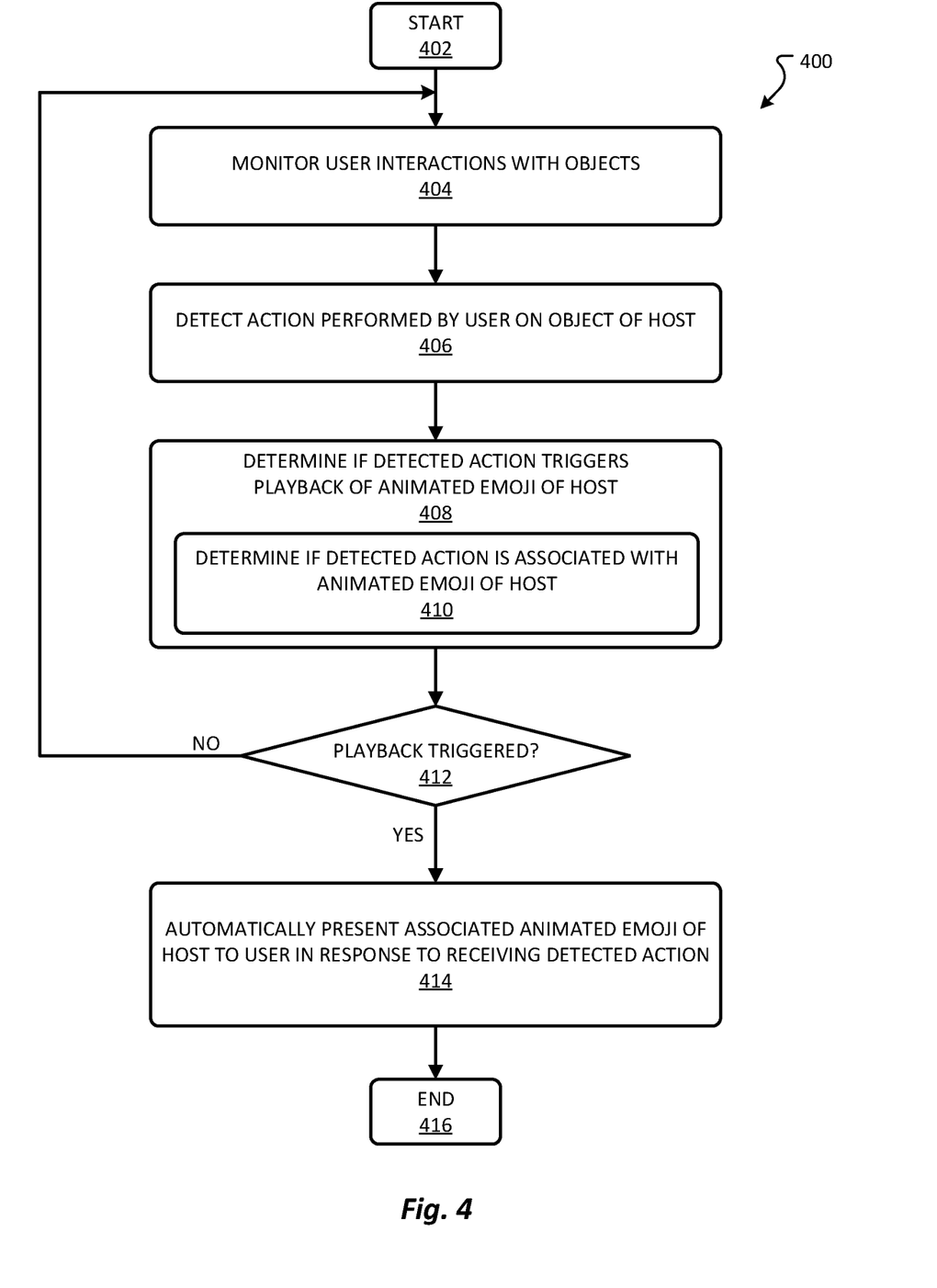
FIG. 4 depicts details of a method for managing an animated emoji playback in accordance with examples of the present disclosure.

Referring now to FIG. 4, a detailed method for managing an animated emoji playback in accordance with examples of the present disclosure is provided. A general order for the steps of a method 400 is shown in FIG. 4. Generally, the method 400 starts at 402 and ends at 416. The method 400 may include more or fewer steps or may arrange the order of the steps differently than those shown in FIG. 4. The method 400 can be executed as a set of computer-executable instructions executed by a computer system and encoded or stored on a computer readable medium. In the illustrative aspect, the method 400 is executed by a server (e.g., the animated emoji management server 150). However, it should be appreciated that aspects of the method 400 may be performed by one or more processing devices, such as a computing device or server (e.g., 120, 150). Further, the method 400 can be performed by gates or circuits associated with a processor, Application Specific Integrated Circuit (ASIC), a field programmable gate array (FPGA), a system on chip (SOC), a neural processing unit, or other hardware device. Hereinafter, the method 400 shall be explained with reference to the systems, components, modules, software, data structures, user interfaces, etc. described in conjunction with FIGS. 1-3.

The method 400 starts at 402, where flow may proceed to 404. At operation 404, the animated emoji management server 150 monitors user interactions with objects. For example, a user may interact with an object by liking, commenting, or otherwise reacting to the object of another user. The objects include any contents (e.g., photos, videos, live stream videos) that are uploaded to the animated emoji management server 150 and/or other server associated with animated emoji management system 100 that is communicatively coupled to the animated emoji management server 150. The objects are stored in an object database of the emoji management server 150. For example, the object database (e.g., 166) may be stored in the emoji management server 150. Alternatively, in some examples, the object database may be communicatively coupled to the animated emoji management server 150.

At operation 406, the animated emoji management server 150 detects an action performed by a user on an object of a host. For example, the action performed by a user may include liking, commenting, or otherwise reacting to a content of another user.

Subsequently, at operation 408, the animated emoji management server 150 determines if the detected action triggers a playback of an animated emoji of the host. To do so, at 410 the animated emoji management server 150 determines if the detected action is associated with any one of animated emojis defined by the host.

If the animated emoji management server 150 determines that a playback is not triggered at operation 412, the method 400 loops back to operation 404 to continue monitoring user interactions with objects. If, however, the animated emoji management server 150 determines that a playback of an animated emoji of the host is triggered by the detected action, the method 400 proceeds to operation 414.

At operation 414, the animated emoji management server 150 automatically presents an animated emoji of the host that is associated with the detected action. It should be appreciated that, in the illustrative aspect, the associated animated emoji may be automatically presented to the user who triggered the detected action without receiving any a host input. For example, if a visiting user likes a video clip posted by a host user, the animated emoji management server 150 may automatically present an animated emoji of the host user that is associated with the like action to the visiting user. In other words, an automatic playback of the animated emoji is presented to the visiting user who triggered the action that is associated with the animated emoji.

In other examples, a host user may start recording a live video with an avatar effect. When the avatar effect is applied on the live video, a user avatar of the host may follow the host in a live mode. For example, a facial expression of the user avatar is driven by the face of the real host user. During the live video, other users may interact with the host user by sending a gift or pressing a like button on the live video. When the gift is sent or the like button is pressed by a guest user, the user avatar automatically follows a predefined animation of an animated emoji of the host user associated with the triggered action on the live stream video. In other words, the user avatar of the host user may react (e.g., laughing) to the triggering action (e.g., receiving a gift) even if the host user does make any facial expression.

It should be appreciated that, in some aspects, the animated emoji management server 150 may present an input option to the host user, such that the host user can manually send the animated emoji to the guest user. For example, the input option may be embodied as an image or icon that appears on a display screen of a computing device of the host user. The image or icon may be a short cut to sending a particular animated emoji of the host user that is associated with receiving a gift. In response, if the host user selects or touches the image or icon, the animated emoji of the host user is sent to the guest user. Once the playback of the animated emoji is presented to the user who triggered the action, the method may end at 416.

It should be appreciated that, although the method 400 is described to be performed by the animated emoji management server 150, one or more operations of the method 400 may be performed by any computing device, such as the computing device 120.

Figure 5:
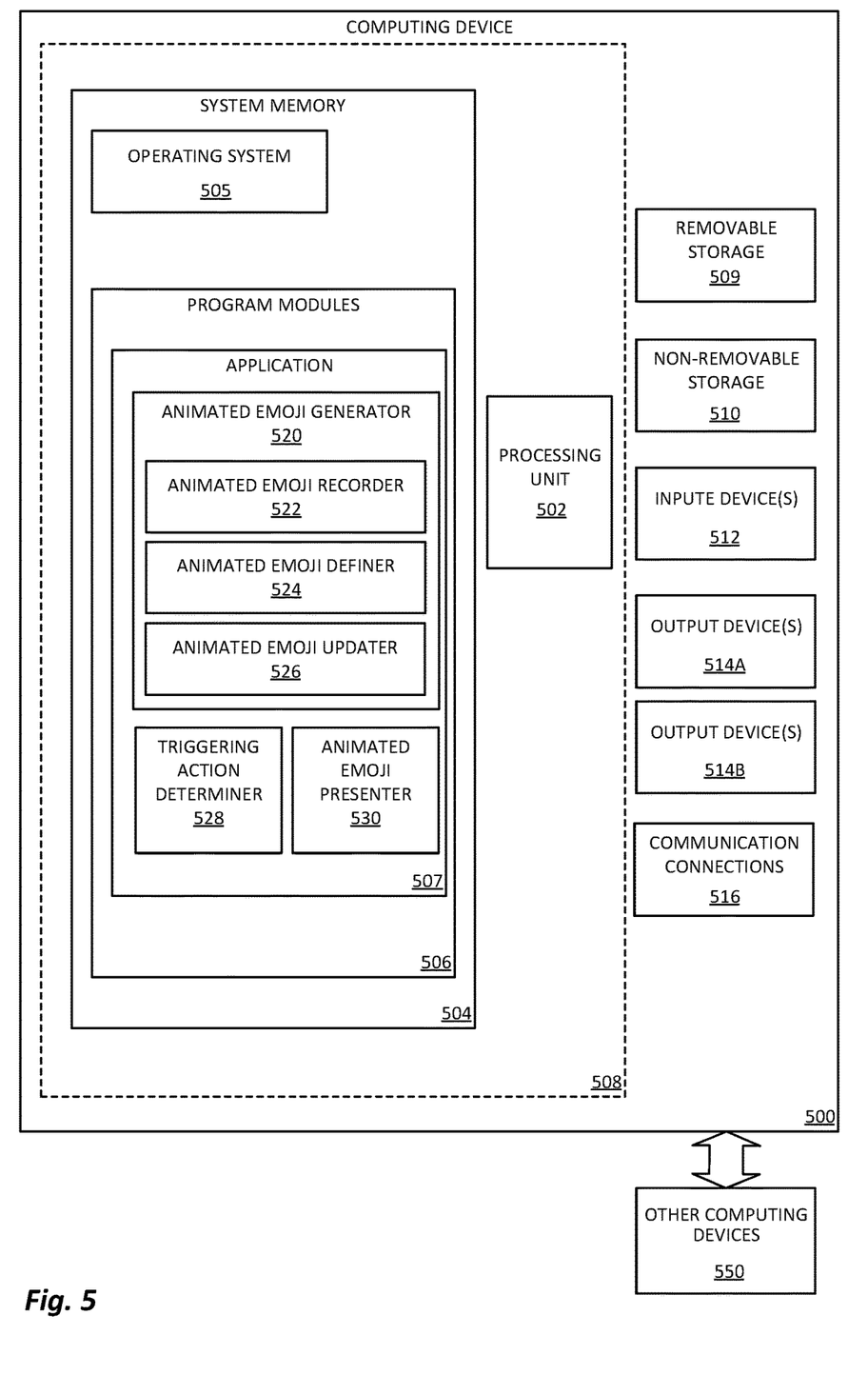
FIG. 5 depicts a block diagram illustrating physical components (e.g., hardware) of a computing device with which aspects of the disclosure may be practiced.

FIG. 5 is a block diagram illustrating physical components (e.g., hardware) of a computing device 500 with which aspects of the disclosure may be practiced that can perform the operation of recording and playback of personalized animated emojis as described above. The computing device components described below may be suitable for the computing devices described above. For example, the computing device 500 may represent the computing device 120 of FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for performing the various aspects disclosed herein such. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, several program modules and data files may be stored in the system memory 504. While executing on the at least one processing unit 502, the program modules 506 may perform processes including, but not limited to, one or more aspects, as described herein. The application 507 includes an animated emoji generator 520, an animated emoji recorder 522, an animated emoji definer 524, an animated emoji updater 526, a triggering action determiner 528, and an animated emoji presenter 530, as described in more detail in FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514A such as a display, speakers, a printer, etc. may also be included. An output 514B, corresponding to a virtual display may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
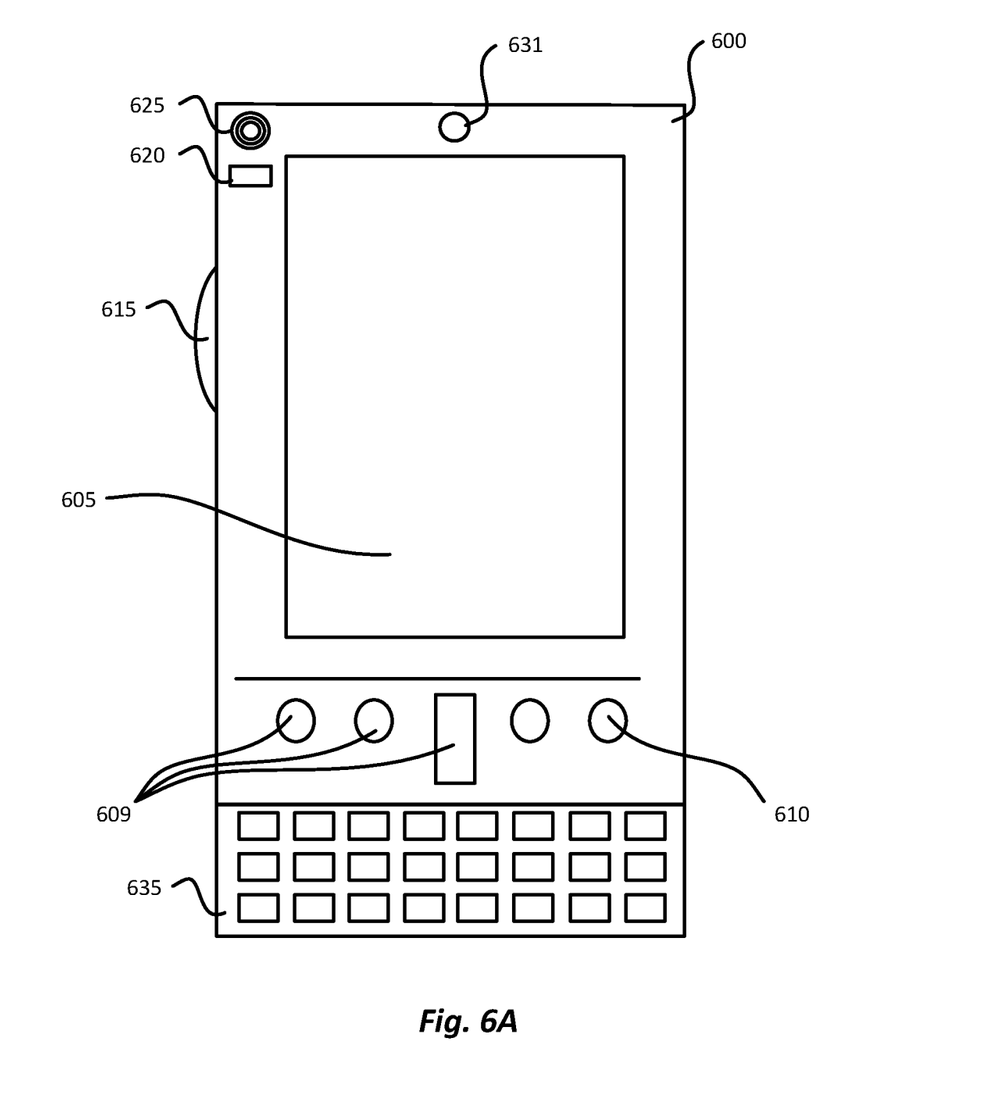
FIG. 6A illustrates a first example of a computing device with which aspects of the disclosure may be practiced.
Figure 6B:
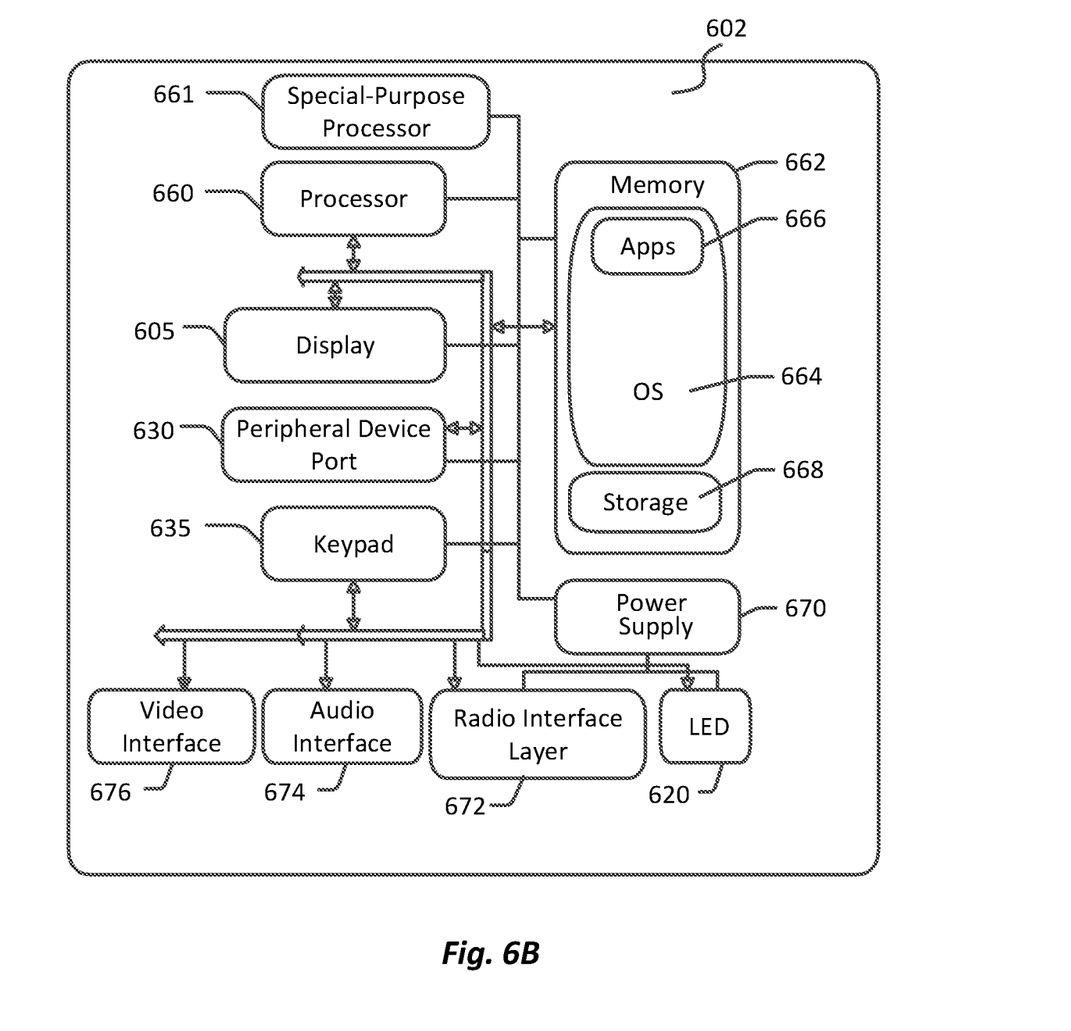
FIG. 6B illustrates a second example of a computing device with which aspects of the disclosure may be practiced.

FIGS. 6A and 6B illustrate a computing device or mobile computing device 600 suitable for performing the various aspects disclosed herein, for example, a mobile telephone, a smart phone, wearable computer (such as a smart watch), a tablet computer, a laptop computer, a smart home appliance, and the like, with which aspects of the disclosure may be practiced that can perform the operation of recording and playback of personalized animated emojis as described above. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 609/610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 631 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports 630, such as an audio input (e.g., a microphone jack), an audio output (e.g., a headphone jack), and a video output (e.g., a HDMI port) for sending signals to or receiving signals from an external source.

FIG. 6B is a block diagram illustrating the architecture of one aspect of computing device, a server, or a mobile computing device. That is, the mobile computing device 600 can incorporate a system (602) (e.g., an architecture) to implement some aspects. The system 602 can implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and/or one or more components supported by the systems described herein. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., an animated emoji generator 520, an animated emoji recorder 522, an animated emoji definer 524, an animated emoji updater 526, a triggering action determiner 528, and an animated emoji presenter 530, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated configuration, the visual indicator 620 is a light emitting diode (LED) and the audio transducer 625 is a speaker. These devices may be directly coupled to the power supply 670 so that when activated, they remain on for a duration dictated by the notification mechanism even though the processor 660/661 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with aspects of the present disclosure, the microphone may also serve as an audio sensor to facilitate control of notifications, as will be described below. The system 602 may further include a video interface 676 that enables an operation of an on-board camera to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
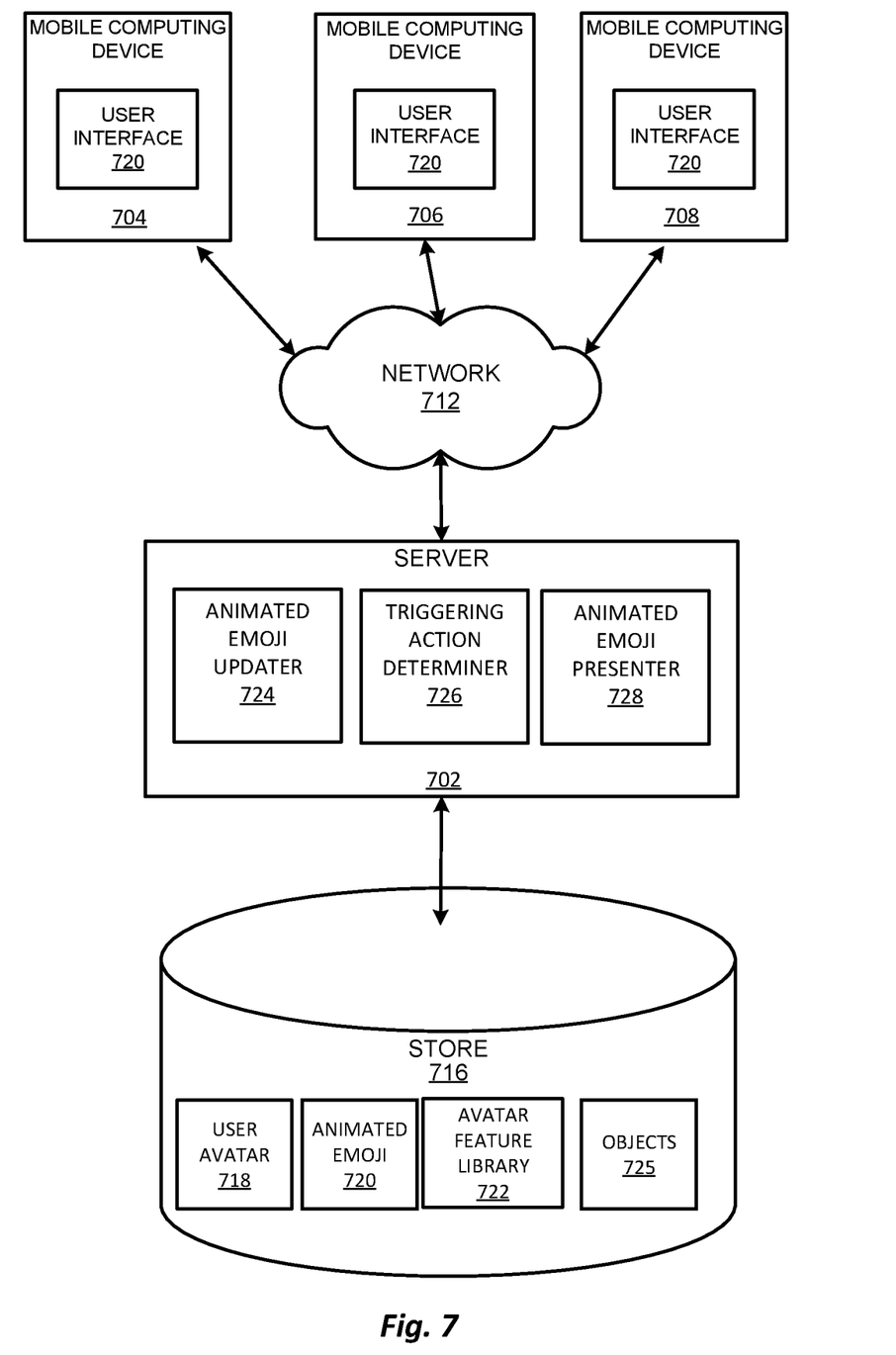
FIG. 7 illustrates at least one aspect of an architecture of a system for processing data in accordance with examples of the present disclosure.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, the computing device 704, 706, 708 may represent the computing device 120 of FIG. 1, and the server device 702 may represent the animated emoji management server 150 of FIG. 1.

In some aspects, one or more of an animated emoji updater 724, a triggering action determiner 726, and an animated emoji presenter 728, may be employed by server device 702. The server device 702 may provide data to and from a client computing device such as a personal computer 704, a tablet computing device 706 and/or a mobile computing device 708 (e.g., a smart phone) through a network 712. By way of example, the computer system described above may be embodied in a personal computer 704, a tablet computing device 706 and/or a mobile computing device 708 (e.g., a smart phone). Any of these aspects of the computing devices may obtain content from the store 716, in addition to receiving graphical data useable to be either pre-processed at a graphic-originating system, or post-processed at a receiving computing system. The content store may include user avatar database 718, animated emoji database 720, an avatar feature library 722, and an object database 725.

FIG. 7 illustrates an exemplary mobile computing device 708 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one." "one or more," "or." and "and/or" are open-ended expressions that are both conjunctive and disjunctive in operation. For example, each of the expressions "at least one of A, B and C." "at least one of A, B, or C." "one or more of A, B, and C." "one or more of A, B, or C." "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more." and "at least one" can be used interchangeably herein. It is also to be noted that the terms "comprising." "including." and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information.

Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving case, and/or reducing cost of implementation.

The present disclosure relates to systems and methods for rendering motion-audio visualizations to a display according to at least the examples provided in the sections below:

(A1) In one aspect, some examples include a method for rendering motion-audio visualizations to a display. The method may include: monitoring user interactions, detecting an action performed by a first user of the users on an object of a second user of the users, determining if the detected action is a triggering action defined by the second user that triggers a playback of an animated emoji of the second user and presenting, in response to determining that the detected action is the triggering action, the playback of the animated emoji of the second user to the first user.

(A6) In some examples of A1-A5, presenting the playback of the animated emoji of the second user to the first user comprises automatically presenting the playback of the animated emoji of the second user to the first user without an input from the second user.

(A7) In some examples of A1-A6, automatically presenting the playback of the animated emoji of the second user comprises: automatically updating a profile photo of the second user from a user profile photo to the animated emoji, presenting a playback of the animated emoji, and returning the profile photo to the user profile photo after the playback of the animated emoji.

(A8) In some examples of A1-A7, automatically presenting the playback of the animated emoji of the second user comprises: automatically updating a user avatar of the second user during a live video streaming to present a playback of the animated emoji of the user avatar regardless of a current facial expression of the second user.

In yet another aspect, some examples include a computing device for managing an animated emoji playback. The computing device may include one or more processors and memory coupled to the one or more processors, the memory storing one or more instructions which when executed by the one or more processors, causes the computing device to perform any of the methods described herein (e.g., A1-A8 described above).

In yet another aspect, some examples include a non-transitory computer-readable medium storing instructions for managing an animated emoji playback, the instructions when executed by one or more processors of a computing device, cause the computing device to perform any of the methods described herein (e.g., A1-A8 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for managing an animated emoji playback, the method comprising:
monitoring user interactions, wherein the user interactions include users interacting with objects of other users;
generating one or more animated emojis by recording an animation of a user avatar with a facial expression of a second user of the users;
associating the one or more animated emojis with a corresponding one or more triggering actions defined by the second user;
detecting an action performed by a first user of the users;
determining if the detected action is at least one of the triggering action of the corresponding one or more triggering actions defined by the second user that triggers a playback of at least one of the associated animated emoji of the one or more animated emojis of the second user; and
automatically presenting, in response to determination that the detected action is the at least one of the triggering action of the corresponding one or more triggering actions, the playback of the at least one of the associated animated emoji of the one or more animated emojis of the second user to the first user.

2. The method of claim 1, wherein the objects include photos, videos, and/or live stream videos.

3. The method of claim 1, wherein the animated emoji of the second user mirrors the animated emoji by the first user in reacting to the receiving the animated emoji by the first user.

4. The method of claim 1, wherein determining if the detected action is a triggering action comprises determining if the detected action is associated with the animation emoji defined by the second user.

5. The method of claim 1, wherein automatically presenting the playback of the at least one of the associated animated emoji of the one or more animated emojis of the second user to the first user without an input from the second user.

6. The method of claim 5, wherein automatically presenting the playback of the at least one of the associated animated emoji of the one or more animated emojis of the second user to the first user comprises:
automatically updating a profile photo of the second user from a user profile photo to the at least one of the associated animated emoji;
presenting a playback of the at least one of the associated animated emoji; and
returning the profile photo to the user profile photo after the playback of the at least one of the associated animated emoji.

7. The method of claim 5, wherein automatically presenting the playback of the at least one of the associated animated emoji of the one or more animated emojis of the second user to the first user comprises:
automatically updating a user avatar of the second user during a live video streaming to present a playback of the at least one of the associated animated emoji of the user avatar regardless of a current facial expression of the second user.

8. A computing device for managing an animated emoji playback, the computing device comprising:
a processor; and
a memory having a plurality of instructions stored thereon that, when executed by the processor, causes the computing device to:
monitor user interactions, wherein the user interactions include users interacting with objects of other users;
generate one or more animated emojis by recording an animation of a user avatar with a facial expression of a second user of the users;
associate the one or more animated emojis with a corresponding one or more triggering actions defined by the second user;
detect an action performed by a first user of the users;
determine if the detected action is at least one of the triggering action of the corresponding one or more triggering actions defined by the second user that triggers a playback of at least one of the associated animated emoji of the one or more animated emojis of the second user; and
automatically present, in response to determination that the detected action is the at least one of the triggering action of the corresponding one or more triggering actions, the playback of the at least one of the associated animated emoji of the one or more animated emojis of the second user to the first user.

9. The computing device of claim 8, wherein the objects include photos, videos, and/or live stream videos.

10. The computing device of claim 8, wherein to determine if the detected action is a triggering action comprises to determine if the detected action is associated with the animation emoji defined by the second user.

11. The computing device of claim 8, wherein automatically present the playback of the at least one of the associated animated emoji of the one or more animated emojis of the second user to the first user without an input from the second user.

12. The computing device of claim 11, wherein to automatically present the playback of the at least one of the associated animated emoji of the one or more animated emojis of the second user to the first user comprises to:
automatically update a profile photo of the second user from a user profile photo to the at least one of the associated animated emoji;
present a playback of the at least one of the associated animated emoji; and
return the profile photo to the user profile photo after the playback of the at least one of the associated animated emoji.

13. The computing device of claim 11, wherein to automatically present the playback of the at least one of the associated animated emoji of the one or more animated emojis of the second user to the first user comprises to automatically update a user avatar of the second user during a live video streaming to present a playback of the at least one of the associated animated emoji of the user avatar regardless of a current facial expression of the second user.

14. A non-transitory computer-readable medium storing instructions for managing an animated emoji playback, the instructions when executed by one or more processors of a computing device, cause the computing device to:
monitor user interactions, wherein the user interactions include users interacting with objects of other users;
generate one or more animated emojis by recording an animation of a user avatar with a facial expression of a second user of the users;
associate the one or more animated emojis with a corresponding one or more triggering actions defined by the second user;
detect an action performed by a first user of the users;
determine if the detected action is at least one of the triggering action of the corresponding one or more triggering actions defined by the second user that triggers a playback of at least one of the associated animated emoji of the one or more animated emojis of the second user; and
automatically present, in response to determination that the detected action is the at least one of the triggering action of the corresponding one or more triggering actions, the playback of the at least one of the associated animated emoji of the one or more animated emojis of the second user to the first user.

15. The non-transitory computer-readable medium of claim 14, wherein to determine if the detected action is a triggering action comprises to determine if the detected action is associated with the animation emoji defined by the second user.

16. The non-transitory computer-readable medium of claim 14, wherein to automatically present the playback of the at least one of the associated animated emoji of the one or more animated emojis of the second user to the first user without an input from the second user.

17. The non-transitory computer-readable medium of claim 14, wherein the objects include photos, videos, and/or live stream videos.

* * * * *